Nov. 18, 1952   J. KAWABATA   2,618,194
MICROMETER READING ATTACHMENT
Filed Nov. 12, 1949
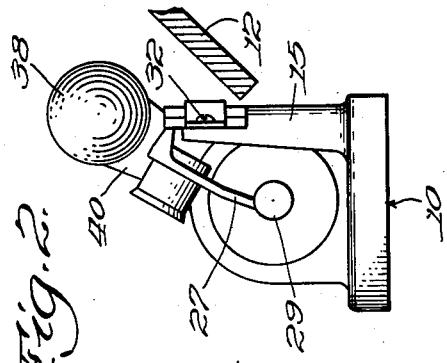
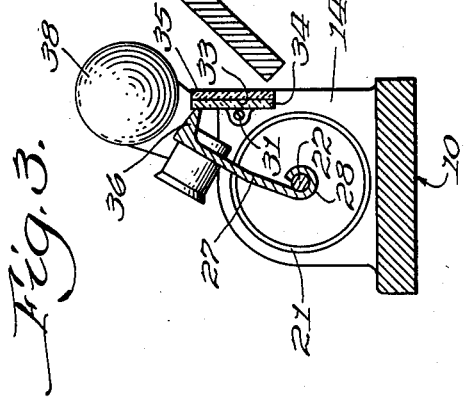
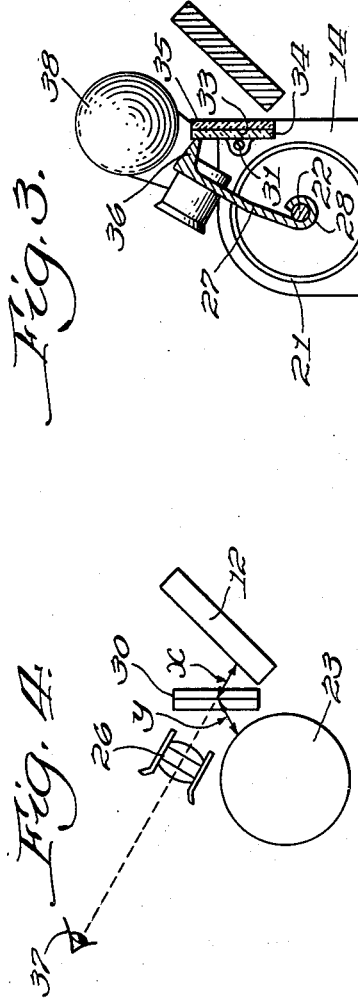
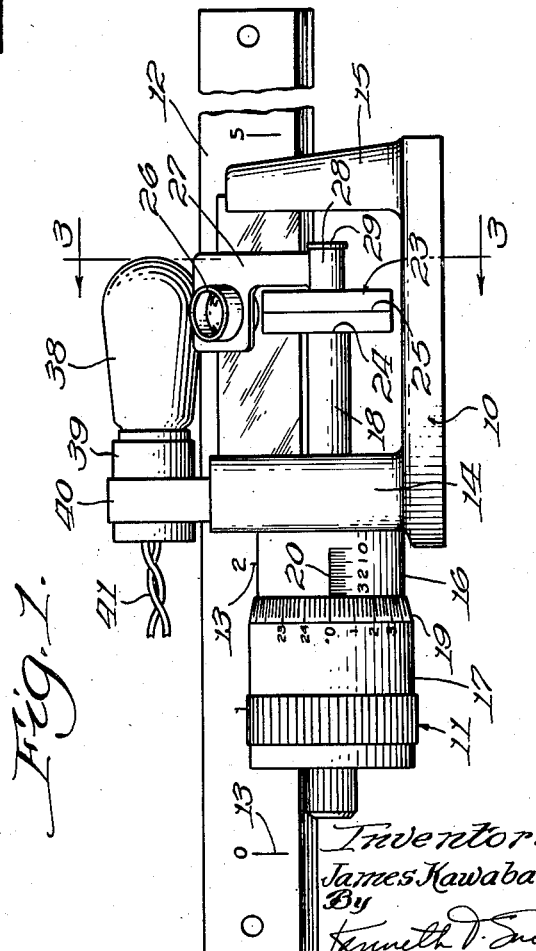
Inventor:
James Kawabata,
By
Kenneth D. Snow
Atty.

Patented Nov. 18, 1952

2,618,194

UNITED STATES PATENT OFFICE 2,618,194

MICROMETER READING ATTACHMENT

James Kawabata, Chicago, Ill.

Application November 12, 1949, Serial No. 126,879

3 Claims. (Cl. 88—14)

1

This invention relates to a new and improved scale reading device.

It is, and always has been, extremely difficult to accurately measure distances and in the accomplishment of such measuring the aligning of one line with another line is necessarily most exacting. Considerable error is caused by parallax when the lines to be matched are not in the same plane. Irregularities in the ends of the lines to be aligned can also cause considerable error when measurements to ten-thousandths of an inch are desired. It is with these minute measurements that the present invention is concerned.

An important object of this invention is to provide means in a scale reading device for accurately aligning opposed lines.

Another important object of this invention is the provision of a sighting device associated with and facilitating scale reading.

Another and further important object of this invention is to supply sighting means for a scale reader which automatically compensates for human operator error in viewing the scale and commonly known as parallax.

A further object of this invention is to provide a sighting mechanism for aligning an inscribed line on a movable member with an inscribed line on a stationary member.

A still further object of this invention is the provision of a sighting attachment for scale readers in which a transparent or partially silvered mirror is positioned midway between the movable and fixed lines whereupon the lines may be accurately superimposed by the viewer with a minimum of effort.

Another and still further important object of this invention is to provide a scale reading device including a movable drum having a circumferential line inscribed therearound and means for aligning this circumferential line with a line on a stationary member and optical means to accomplish such aligning by superimposition of the one line on the other.

Other and further important objects of this invention will become apparent from the disclosures in the following specification and accompanying drawings.

In the drawings:

Figure 1 is a front elevational view of the micrometer reading attachment of this invention.

Figure 2 is an end elevational view of the device as shown in Figure 1.

Figure 3 is a sectional view taken on the line 3—3 of Figure 1.

Figure 4 is a diagrammatic view of the optical operation of the sighting mechanism.

As shown in the drawings:

The reference numeral 10 indicates generally a support upon which the micrometer 11 is mounted. Positioned adjacent the support 10 is a scale

2

12 having inscribed spaced lines 13, which lines are numerically numbered as shown. It is the function of this device to measure the relative longitudinal movement that may occur between the elements 10 and 12. Either one of the elements 10 or 12 may be made stationary and the other part or element may move longitudinally with respect thereto. Thereafter the micrometer 11 may be adjusted to show how much the one or other element has been moved. Assume, for example, that the element 10 remains fixed and that the scale 12 is moved slightly in one direction. The micrometer is then adjusted to compensate for the movement of the scale 12 and a reading may be had directly on the micrometer to show exactly how much the scale 12 was previously moved.

The support 10 includes a first post or micrometer bracket 14 and a laterally spaced post 15. The micrometer 11 consists of a supporting shell or housing 16 for fixed mounting within the bracket 14, a rotating drum 17, and a longitudinally extensible and rotatable member 18 which forms a lateral extension of the rotating drum 17 beyond the fixed part 16. A micrometer is, of course, an instrument to measure small distances and it accomplishes this by a calibrated scale 19, annularly positioned around the movable drum 17, and a longitudinally extending scale 20, inscribed on the fixed member 16. Both of these scales 19 and 20 bear a definite relationship to the pitch of the threads employed within the instrument. Thus, if the rotatable drum 17 is rotated a certain distance the member 18 will be extended a predetermined distance from the fixed part 16 of the micrometer. The micrometer 11 is attached to the element 10 by means of the integral bracket 14 which has a sleeve-like micromoter holding portion 21.

The micrometer extensible member 18 is provided with a reduced diameter shaft extension 22. A cylindrical drum member 23 is mounted on and fixed to said shaft extension in abutting relationship with the shoulder 24 of the member 18. The drum 23 has inscribed around the center thereof an annular line 25. The drum 23 thus rotates and shifts simultaneously with the extensible member 18, and it is the annularly inscribed line 25 on the drum which is aligned with one of the inscribed lines 13 on the scale 12.

The micrometer is additionally provided with sighting means through which the lines 25 and 13 are superimposed by particular means to eliminate the human error both in the inscribing of the lines, and the error of aligning one line with another. This sighting means includes a lens member 26 carried in a bracket 27, which in turn is mounted by means of a sleeve member 28 on the extension shaft 22 beyond the end of the drum 23. An outwardly extending annular flange 29 on the end of the shaft 22 holds the sleeve 28 in fixed longitudinal relationship on the shaft 22. It will be apparent from this construction that the lens 26 will be substantially centered over the annular inscribed line 25 on the drum 23 at all times, regardless of the longitudinal position of the drum 23, inasmuch as the bracket 27 carrying the lens 26 is arranged and constructed to move with the drum 23. The sleeve 28 is loosely carried on the shaft extension 22 in order to permit rotation of the shaft 22 without tending to rotate the lens holder.

A half silvered or transparent mirror 30 is provided in a position between the lens 26 and the scale 12. The half silvered mirror 30 is carried by the spaced posts 14 and 15 on the support 10. The attachment of the mirror to the post 14 is shown at 31 in Figure 3 and to the post 15 at 32 in Figure 2. The transparent mirror 30 is of a type now commercially available and includes a mirror coating at 33 which is thin enough to be transparent. Glass plate members 34 and 35 enclose the mirror coating 33, thus protecting it against damage either by abrasion in cleaning or other possible scratching as well as to delay oxidation of the metal coating. The very thin mirror coating 33 permits transmission of sight as well as reflection, and thus is ideally suited for the particular application of this invention.

The lens bracket 27 is provided with a foot or spacer member 36 arranged and constructed to slide on the surface of the mirror 30 during micrometer adjustment. The looseness of the sleeve 28 on the shaft 22 permits gravity to hold the lens bracket foot 36 against the mirror thus maintaining a fixed spacing between lens and mirror for proper and constant focus of the scale and drum.

It should be noted that the transparent mirror 30 is positioned exactly midway between the drum 23 and the scale 12. An operator or user of this device views the scales, that is the inscribed lines 13, on the scale member 12 and simultaneously the annularly inscribed line 25 on the drum 23 by viewing through the lens 26. The operator's sight is permitted to travel directly through the transparent mirror 30 to the scale 12 and simultaneously to reflect from the transparent mirror 30 to the drum 23.

In order to completely understand the operation of the device, it was believed desirable to indicate the position of the operator's or user's eye and this is shown at 37 in diagrammatic Figure 4. The operator directs his vision as shown in Figure 4 through the lens 26 and thereupon simultaneously uses the scale 12 and the drum 23. The drum 23 is axially shiftable by means of the micrometer hand rotor 17 and as a result the annular line 25 may be moved until it aligns itself with one of the scale inscribed lines 13 on the scale 12. The distances designated by the letters X and Y are the same length. In other words, as the operator views the inscribed lines 13 and 25, they are in effect in one plane. As long as the inscribed lines to be superimposed are in the same plane for all effects, then parallax is not a problem to contend with in this device. Parallax is any apparent displacement of an object due to an observer's position. In this sighting device the observer or operator may move his sighting position throughout a considerable angle before he materially affects his reading. The annular line 25 on the drum 23 can be superimposed very accurately on any one of the lines 13 on the scale 12 because the lines can be split. On the conventional vernier the lines must be matched and thus any local errors in the line may affect the reading. By splitting the lines, any variation in width of the lines has little effect and any small bumps or waves in the lines may be detected and disregarded. Split line accuracy instead of matched line accuracy and elimination of parallax account for a high degree of accuracy of this instrument. The lens 26 which may be plural is generally to be provided with a magnification making the superimposing of the lines easier for the operator. A light bulb 38 located above the lens and transparent mirror and positioned substantially between these two elements is provided for illumination of these elements to facilitate reading. The bulb 38 preferably electric is mounted in a socket 39. The socket 39 is held by a clamp 40 projecting upwardly from the bracket 14. A suitable source of electrical energy is delivered to the lead wires 41 to cause illumination of the bulb 38. The superimposing of the scale line on the drum line is made very accurate by a combination of magnification by the lens 27, illumination by the bulb 38, elimination of parallax, having split line accuracy in utilizing the full drum line and the full scale line in their entireties so that inaccuracies in any portion or portions of these lines may be eliminated. Scale reading is also facilitated by the psychological centering action obtained as the eye of the operator automatically tends to superimpose the scale lines.

In constructing the device the shaft 18 and drum 23 should be accurately concentric in order that there shall be no wobble. Further, to make reading of the instrument easier it is desirable to have the drum surface entirely black and the annularly inscribed line white so that the superimposing of one of the black scale lines 13 on the annular white line 25 will be made considerably easier. It should be understood that it is not essential to have this annular drum line white but rather only that white facilitates the alignment of the lines 13 and 25. The glass plates 34 and 35 of the mirror 30 will cause a deflection in the sight lines of the observer due to the refractive index of the mirror glass. However, in view of the fact that the instrument will operate regardless of the index of refraction of the mirror glass, it has been deemed advisable not to obscure the invention as set forth herein by describing these minute offsets in observation lines. The device works identically regardless of whether or not the index of refraction is taken into account.

There are numerous applications to which this instrument may be applied. As an example, the instrument may be used as a height gauge, or may be used on milling machines or small jig bores to accurately measure change or relative change of positions of two elements. In a height gauge it is possible to obtain considerable accuracy with the instrument of this invention which will mean that many layout and gauging operations may be performed without the use of gauge blocks. Further, when the instrument is used on a milling machine or other similar machine it has an advantage that no length standards are necessary and the machine table can be jarred or moved at any speed without damage to the measuring elements. It is preferable that the device be properly housed depending upon its particular application.

It is believed that herein is provide a novel measuring apparatus with a sighting means that is practically infallible for any operator. Numerous details of construction may be varied throughout a wide range and this device may be used in numerous applications without departing from the principles disclosed herein, and I therefore do not propose limiting the patent granted hereon otherwise than as necessitated by the appended claims.

What is claimed is:

1. A measuring apparatus for measuring the separation between spaced lines and utilizing a member having at least one straight line inscribed thereon comprising a support positioned closely adjacent said member, an axially movable drum member having a circumferential line inscribed about the periphery thereof and carried on said support so that the axis of the drum is substantially parallel to said member and the plane formed by the circumferential line is parallel to the inscribed line on said member, means for moving said drum member longitudinally along said support by rotating said drum member, and a sighting means for accurately aligning said circumferential line with the straight line on said member, said sighting means including a transparent mirror disposed between said member and the movable drum member whereby the operator's eye may simultaneously view both the line on said member and the circumferential line on the drum for easy superimposing the one on the other and relative movement between said member and said drum may be accurately determined.

2. A measuring apparatus for measuring the separation between spaced lines and utilizing a relatively flat scale with spaced lines inscribed thereon, comprising a supporting structure spaced from said scale and carrying a drum having an annularly inscribed line therearound, the plane of said annular line being parallel to the spaced lines inscribed on the flat scale, means for moving said drum longitudinally of said flat scale, a half silvered mirror positioned between said flat scale and said drum, a lens mounted on said movable drum and directed on said half silvered mirror and said flat scale, whereby the lines on the flat scale and the annular line on the drum may be readily simultaneously viewed through the lens and the superimposing of the drum line on any one of the lines on the flat scale is made relatively easy and positive.

3. A measuring apparatus as set forth in claim 2 in which the half silvered mirror is disposed exactly midway between the flat scale and the drum whereby accurate superimposing of the drum line on one of the flat scale lines may be accomplished despite varied angular sighting through the lens.

JAMES KAWABATA.

REFERENCES CITED

The following references are of record in the file of this patent:

UNITED STATES PATENTS

| Number | Name | Date |
| --- | --- | --- |
| 411,444 | Irmen | Sept. 24, 1889 |
| 706,297 | De Bruyn | Aug. 5, 1902 |
| 2,060,528 | Powell | Nov. 10, 1936 |
| 2,289,557 | Taylor | July 14, 1942 |
| 2,344,296 | Frink | Mar. 14, 1944 |
| 2,493,628 | Harley | Jan. 3, 1950 |

FOREIGN PATENTS

| Number | Country | Date |
| --- | --- | --- |
| 722,013 | Germany | June 27, 1942 |